March 29, 1955 W. G. CRAWFORD 2,704,994
PAN CLEANING AND GREASING MACHINES
Filed Nov. 9, 1953 2 Sheets-Sheet 1

INVENTOR.
William G. Crawford
BY Chas Denegre
Attorney.

March 29, 1955  W. G. CRAWFORD  2,704,994
PAN CLEANING AND GREASING MACHINES
Filed Nov. 9, 1953  2 Sheets-Sheet 2
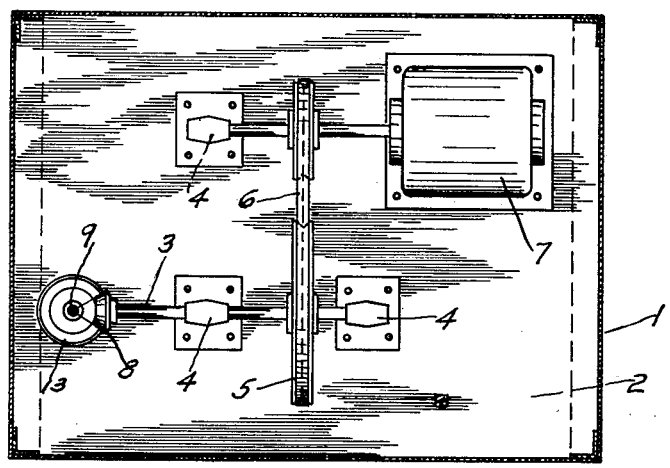
Fig. 4.
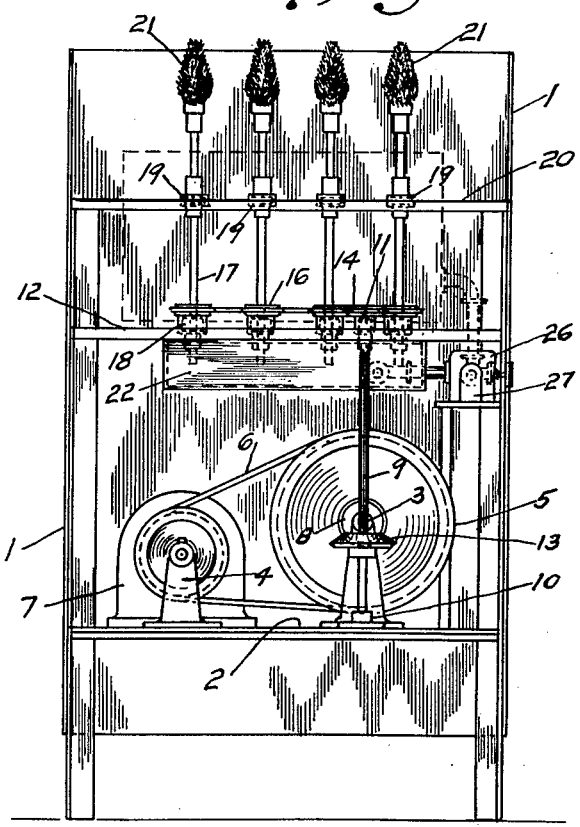
Fig. 3.
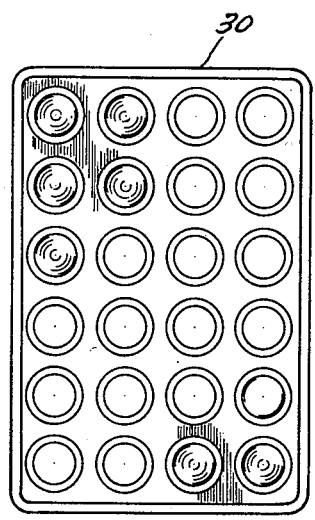
Fig. 5.
Fig. 6.
INVENTOR.
William G. Crawford
BY Chas. Denegre
Attorney.

United States Patent Office 2,704,994
Patented Mar. 29, 1955

2,704,994

PAN CLEANING AND GREASING MACHINES

William G. Crawford, Birmingham, Ala.

Application November 9, 1953, Serial No. 390,868

1 Claim. (Cl. 118—255)

This invention relates to a pan cleaning and greasing machine. It has for its main objects to provide such a machine that will be highly efficient for the purpose intended, simple in structure, comparatively cheap to manufacture, easy to operate and keep in working order, and extremely durable.

The machine is specially but not exclusively intended for use in cleaning baking pans in a bakery because it is very important to remove any small particles of dough that might cling to the pans and become attached to the next loaves baked in the pans.

Other objects and advantages will appear from the drawings and description.

Figure 1:
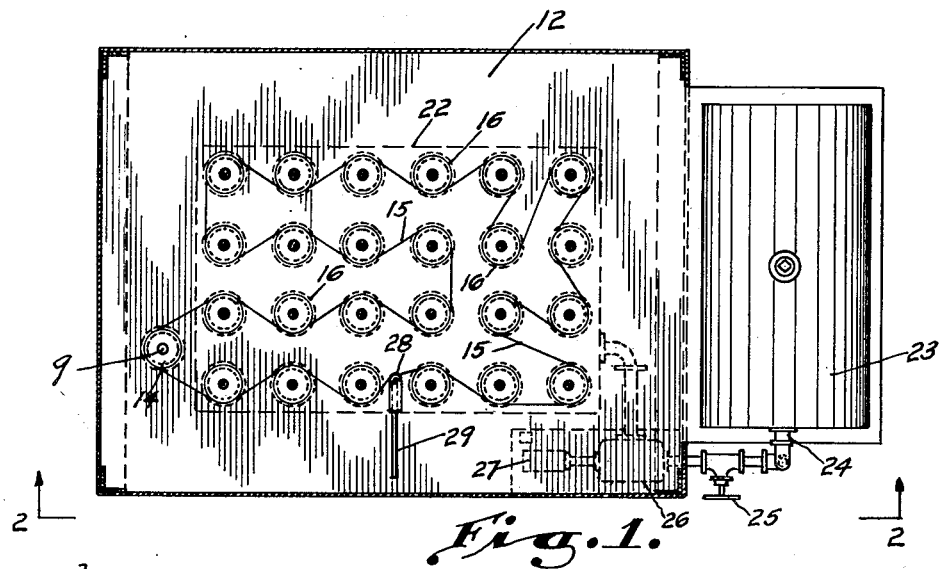
Figure 2:
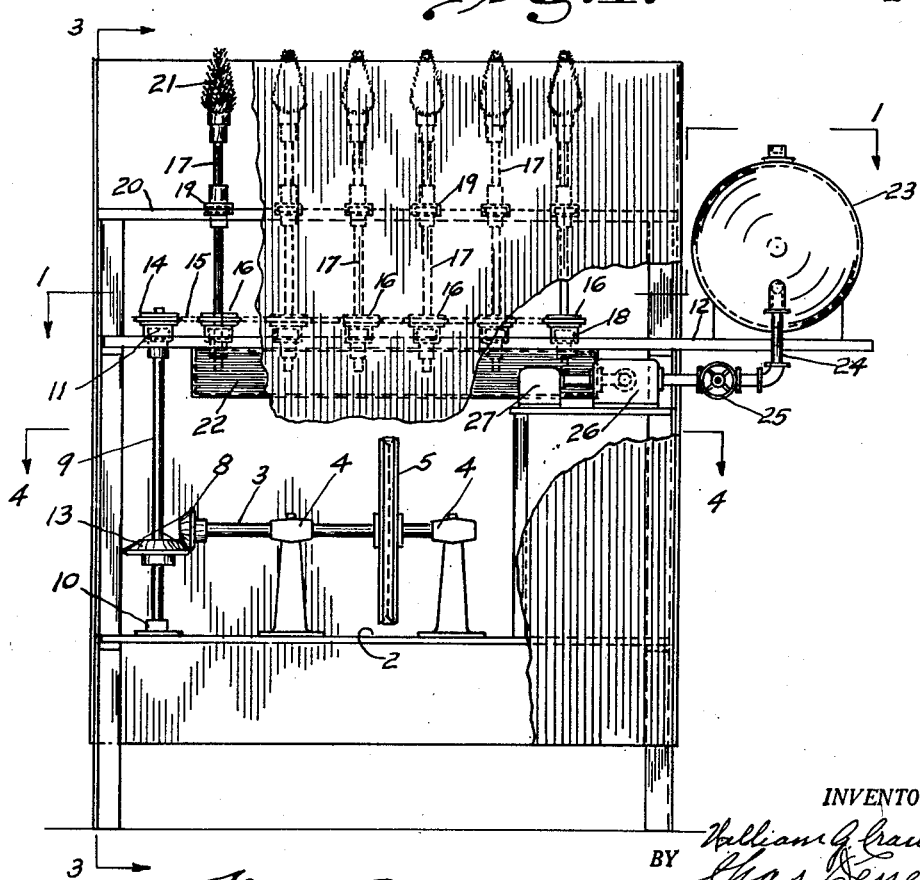

By referring generally to the drawings, a part of this application, it will be observed that Fig. 1 is a sectional view on line 1—1 of Fig. 2 showing how one chain operates the perpendicular shafts having the cleaning brushes thereon, and other parts of the assembly; Fig. 2 is a view on line 2—2 of Fig. 1, part full and part cut away; Fig. 3 is a view on line 3—3 of Fig. 2 with wall of case removed; Fig. 4 is a view on line 4—4 of Fig. 2; Fig. 5 is a plan view of a roll baking pan that is placed upside down on the brushes that fit into its compartments for cleaning and greasing; a plain flat bottom pan is moved about on the brushes for cleaning and greasing; and Fig. 6 is an end view of the pan shown in Fig. 4.

Similar reference numerals refer to similar parts throughout the several views.

Referring to the drawings in detail it will be seen that the machine comprises a main case 1 preferably made of rust proof metal, a supporting floor 2 for shaft 3 carried in bearings 4. A pulley 5 is mounted on the shaft adapted for being driven by a belt 6 and electric motor 7. A bevel gear 8 is mounted on one end of the shaft. A perpendicular shaft 9 is carried in a bearing 10 on the floor 2 and a bearing 11 in another floor 12. A bevel gear 13 is mounted on the lower portion of the perpendicular shaft 9 and is in mesh with bevel gear 8. A sprocket gear 14 is mounted on the top end of the shaft 9 and drives a chain 15 attached around gears 16 attached to the lower ends of shafts 17 carried in bearings 18 in the second floor 12 and bearings 19 in the upper floor 20. A brush 21 is mounted on the top end of each shaft 17. The shafts 17 are hollow and extend down into a container 22 attached in air tight condition to the underface of floor 2. Tank 23 is for oil that flows through pipe 24 under control of valve 25 leading to a pump 26 operated by an electric motor 27 for the purpose of keeping the container 22 full to thus force oil up through the center hollows of shafts 17 to be applied by the brushes 21 to any pan resting upside down on the brushes. The valve regulates the flow of oil for use on the brushes. The driving chain 15 is provided with an adjusting roller 28 on bar 29 for taking up slack in the chain. One type of pan 30 is shown.

From the foregoing it will appear that various sizes of flat bottom pans may be cleaned and greased by placing same upside down on the brushes while they are revolving.

The various parts of the machine may be made of any material suitable for the purpose. Also the parts may be made in different sizes and capacities, depending on how and where to be used.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A pan cleaning and greasing machine of the character described comprising a main case, an elevated floor attached in the lower portion of the case, a shaft with its bearings mounted upon said floor, a belt pulley attached upon said shaft, an electric motor mounted upon said floor, a driving belt leading from said motor to said pulley on the shaft, a bevel gear attached on one end of said shaft, a perpendicular shaft mounted with its lower end in a bearing on said floor, a second floor attached in said case above the other floor, the said perpendicular shaft having its upper end mounted in a bearing on said second floor, a bevel gear attached on the lower portion of said perpendicular shaft, said two bevel gears being in mesh with each other, a sprocket gear attached on the upper end of said perpendicular shaft, a plurality of hollow shafts mounted perpendicularly in two bearings for each, one of said bearings being in said second floor, a third floor attached in the upper portion of the case, said hollow shafts being supported in bearings in said third floor, each of said hollow shafts having a sprocket gear attached on it, a brush attached on the upper end of each of said hollow shafts, a sprocket type chain mounted partially around said sprocket on the perpendicular shaft and partially around said sprocket gears on said hollow shafts, a sealed container for oil attached to the under face of said second floor, said hollow shafts having their lower ends extended into said oil container, a main oil supply tank mounted on a supporting extension on said case, a pipe with a valve therein attached to said oil supply tank, a pump mounted near said oil container having the shaft ends therein, said pipe leading from said supply tank connected to said pump, a pipe leading from said pump to said oil container, an electric motor connected to said pump.

References Cited in the file of this patent

UNITED STATES PATENTS

| | | |
|---|---|---|
| 997,347 | Walker | July 11, 1911 |
| 1,532,256 | Moller | Apr. 7, 1925 |